(12) United States Patent
Powell et al.

(10) Patent No.: US 10,718,436 B2
(45) Date of Patent: Jul. 21, 2020

(54) VALVE SEAT REPLACEMENT SYSTEM AND METHOD

(71) Applicant: GE Oil & Gas Pressure Control LP, Houston, TX (US)

(72) Inventors: Jonathan Keith Powell, Houston, TX (US); Brian Munk, Houston, TX (US); Guy Mitelman, Houston, TX (US); Lloyd Cheatham, Lake Jackson, TX (US)

(73) Assignee: GE Oil & Gas Pressure Control LP, Houston, TX (US)

( * ) Notice: Subject to any disclaimer, the term of this patent is extended or adjusted under 35 U.S.C. 154(b) by 45 days.

(21) Appl. No.: 15/907,755

(22) Filed: Feb. 28, 2018

(65) Prior Publication Data
US 2019/0264818 A1 Aug. 29, 2019

(51) Int. Cl.
*F16K 3/30* (2006.01)
*F16K 3/02* (2006.01)
*F16K 27/02* (2006.01)
*F16K 3/20* (2006.01)

(52) U.S. Cl.
CPC .......... *F16K 3/0236* (2013.01); *F16K 3/0272* (2013.01); *F16K 3/205* (2013.01); *F16K 3/30* (2013.01); *F16K 27/0272* (2013.01); *Y10T 137/6079* (2015.04)

(58) Field of Classification Search
CPC . Y10T 137/6079; F16K 1/427; F16K 3/0272; F16K 3/205; F16K 3/30
USPC ................................................ 251/328, 360
See application file for complete search history.

(56) References Cited

U.S. PATENT DOCUMENTS

| | | | | |
|---|---|---|---|---|
| 2,678,802 A | * | 5/1954 | Thayer | F16K 3/30 251/328 |
| 3,175,802 A | * | 3/1965 | Bredtschneider | F16K 3/12 251/328 |
| 3,285,565 A | * | 11/1966 | Barnier | F16K 3/30 251/328 |
| 3,497,177 A | | 2/1970 | Hulsey | |
| 4,240,460 A | * | 12/1980 | Alaniz | F16K 3/186 137/327 |
| 4,246,928 A | * | 1/1981 | Burns, IV | F16K 3/16 137/315.32 |

(Continued)

FOREIGN PATENT DOCUMENTS

CN 205001544 U 1/2016

OTHER PUBLICATIONS

"In-situ Valve Seat Replacements," https://www.globatweir/services/flow-control-service-catalogue/in-situ-valve-seat-replacements, Weir Group, 2018.

*Primary Examiner* — Kevin F Murphy
(74) *Attorney, Agent, or Firm* — Hogan Lovells US LLP

(57) ABSTRACT

Embodiments of the present disclosure include a valve sleeve for forming at least a portion of a valve flow passage. The valve sleeve includes a seat end having a seat face, the seat end extending at least partially into a chamber of a valve body. The valve sleeve also includes a sleeve portion coupled to the seat end and having a coupling end opposite the seat face, the coupling end comprising a retaining mechanism for removably coupling the valve sleeve to the valve body. The valve sleeve further includes an opening extending along a length of the valve sleeve, the opening forming at least a portion of the valve flow passage and having a generally circular cross section.

12 Claims, 12 Drawing Sheets

(56) References Cited

U.S. PATENT DOCUMENTS

| | | | | |
|---|---|---|---|---|
| 4,376,526 A | * | 3/1983 | Freeman | F16K 3/02 |
| | | | | 251/167 |
| 4,446,883 A | * | 5/1984 | Paul, Jr. | F16K 43/00 |
| | | | | 137/315.18 |
| 4,519,582 A | * | 5/1985 | Freeman | F16K 3/02 |
| | | | | 251/167 |
| 5,211,373 A | | 5/1993 | Baker | |
| 7,481,239 B2 | * | 1/2009 | McGuire | F16K 3/0236 |
| | | | | 137/242 |
| 7,950,410 B2 | | 5/2011 | McGuire et al. | |
| 7,992,840 B2 | * | 8/2011 | Cain | F16K 3/0227 |
| | | | | 251/326 |
| 8,813,771 B2 | | 8/2014 | Rayment et al. | |
| 8,973,897 B2 | * | 3/2015 | Cordova | F16K 3/02 |
| | | | | 251/327 |
| 2015/0014568 A1 | * | 1/2015 | Sundararajan | F16K 3/0236 |
| | | | | 251/328 |

* cited by examiner

VALVE SEAT REPLACEMENT SYSTEM AND METHOD

BACKGROUND

1. Field of the Invention

The present disclosure relates in general to a valve assembly, and in particular to externally replaceable valve sleeves of the valve assembly.

2. Description of Related Art

During well site operations, such as hydraulic fracturing, fluid is transmitted through various valve assemblies. This fluid may be abrasive and erode components of the valve assembly, such as the valve body and/or the valve sleeves. Erosion of the components may lead to leakage and costly repairs. Because a valve body is often more expensive than valve seats, the valve seats may be formed from material that erodes first and are scheduled for periodic maintenance or replacement. Replacing the valve seats may be costly because the valve is isolated, cleared, disassembled, and then reassembled. During disassembly and reassembly, components of the valve may be separated and then reinstalled in a specific order, which may be time consuming and prone to errors. It is now recognized that improved systems and methods for valve seat replacement are desirable.

SUMMARY

Applicants recognized the problems noted above herein and conceived and developed embodiments of systems and methods, according to the present disclosure, for valve sleeve replacement.

In an embodiment a valve for controlling a fluid flow includes a valve body having an inlet at a first end, an outlet at a second end, and a chamber positioned between the inlet and outlet. The valve also includes a valve member moveable between an open position and a closed position, the valve member positioned within the chamber and blocking flow through the valve body when in the closed position and enabling flow through the valve body when in the open position. The valve further includes a valve sleeve extending from at least one of the inlet or outlet into the chamber, the valve sleeve comprising a seat face at a seat end proximate the valve member, wherein the valve member contacts the seat face when in the open position and the closed position.

In another embodiment a valve sleeve for forming at least a portion of a valve flow passage includes a seat end having a seat face, the seat end extending at least partially into a chamber of a valve body. The valve sleeve also includes a sleeve portion coupled to the seat end and having a coupling end opposite the seat face, the coupling end comprising a retaining mechanism for removably coupling the valve sleeve to the valve body. The valve sleeve further includes an opening extending along a length of the valve sleeve, the opening forming at least a portion of the valve flow passage and having a generally circular cross section.

In an embodiment a method for installing a valve sleeve within a valve body includes removing a first valve sleeve, the first valve sleeve coupled to a valve body of the valve assembly. The method also includes installing a second valve sleeve within the valve body. The method further includes coupling the second valve sleeve to the valve body.

BRIEF DESCRIPTION OF DRAWINGS

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

DETAILED DESCRIPTION

Figure 1:
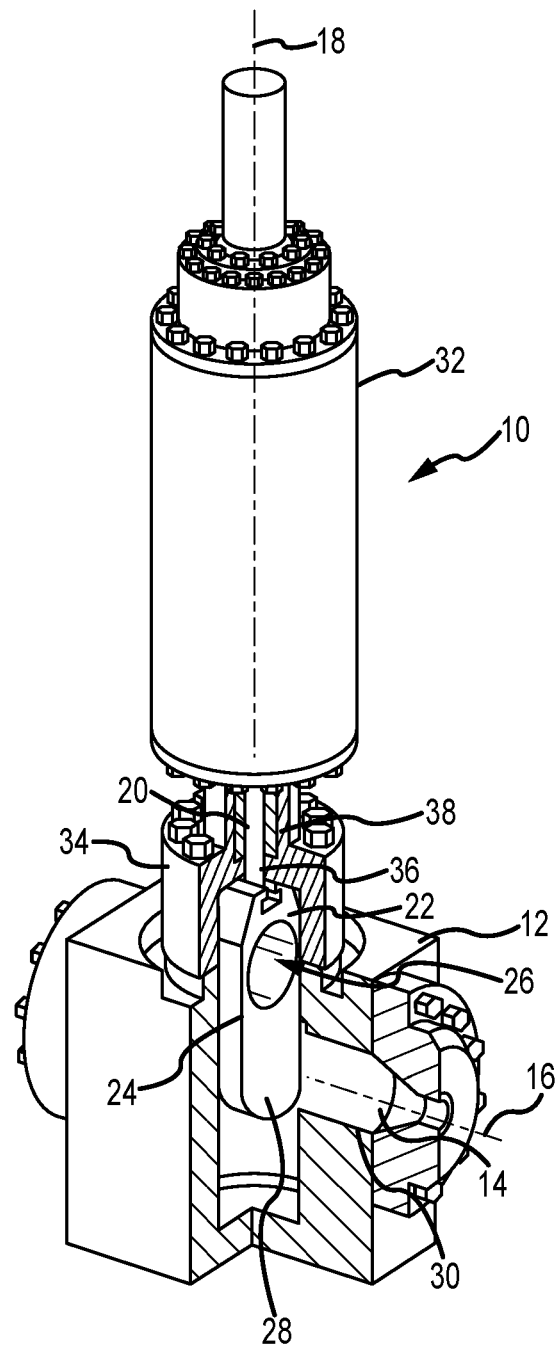
FIG. 1 is a partial front perspective view of an embodiment of a valve assembly, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Embodiments of the present disclosure include systems and methods for utilizing valve sleeves in order to replace or repair seating faces within valves, such as gate valves. In various embodiments, the seat faces are externally replaceable via a removable valve sleeve that may be installed through respective ends of a valve along a flow passage. The valve sleeves may extend into a cavity formed in the valve and be arranged to enable a valve member to seat against the valve sleeves, thereby forming a metal-to-metal seal, in some embodiments. In various embodiments, at least a portion of the valve sleeve is individually replaceable. For example, seat faces of the valve sleeve may be subjected to the highest amount of wear or erosion, and as a result, may be individually replaceable relative to the remainder of the valve sleeve to thereby reduce costs. Moreover, in various embodiments the valve seats and/or valve sleeves may be formed from material that is particularly selected to be sacrificial relative to the valve body. That is, the valve seats and/or valve sleeve may be formed from a material that is not as hard as the valve body or that otherwise will preferentially wear out first, thereby reducing costs because replacing the valve sleeves may be cheaper than replacing the valve body. In certain embodiments, the valve sleeve includes retaining mechanisms to couple the valve sleeve to the valve body. The retaining mechanisms may include retention features, which may be rotatable or otherwise moveable between an engaged position and a disengaged position. Further, in various embodiments, the retaining mechanisms may be fasteners and/or threaded components. Corresponding features in the valve body may be pre-fabricated to accommodate the valve sleeves or may be machined into the valve body during maintenance operations. In certain embodiments, the valve sleeve may facilitate improved maintenance operations for the valve assembly. For example, a length of the valve sleeves may be particularly selected to control tolerances within the valve body related to the valve member seating against the seat faces. Further, in embodiments, assembly of the valve may be more efficient because the valve member may not be translated through the seats during installation. Rather, the valve sleeves may be externally slid into position regardless of the position of the valve member. In this manner, systems and methods of the present disclosure enable improved maintenance and operation of valve assemblies.

FIG. 1 is a partial perspective view of an embodiment of a valve assembly 10 including a valve body 12 and a flow passage 14 that extends transversely through the valve body 12 along a flow axis 16. In the illustrated embodiment, the flow axis 16 is substantially perpendicular to a stem axis 18 of a valve stem 20. The illustrated valve stem 20 is coupled to a valve member 22. As shown, the valve member 22 includes a body 24 having an opening 26 and a block 28. When the opening 26 aligns with the flow passage 14, fluid is permitted to flow through the valve body 12 along the flow axis 16. However, when the block 28 aligns with the flow passage 14, fluid is blocked from flowing through the valve body 12. It should be appreciated that while the illustrated embodiment includes a rising-stem type valve assembly 10, embodiments of the present disclosure may be used on non-rising stem type valve assemblies. Furthermore, while the embodiment illustrated in FIG. 1 includes the valve assembly 10 is in a closed position when the stem 20 is retracted and an open position when the stem 20 is extended, in other embodiments different valve configurations may be utilized.

The illustrated embodiment further includes a valve sleeve 30 arranged coaxially with the flow axis 16. In various embodiments, the valve sleeve 30 is utilized to seal the flow passage 14 while the valve member 22 is in the closed position. Further, the valve sleeve 30 may be used to form at least a portion of the flow passage 14 when the valve member 22 open position such that the opening 26 aligns with the flow passage 14. As shown in FIG. 1, the valve assembly 10 further includes an actuator 32 coupled to the valve body 12 around the valve stem 20 to drive the valve member 22 between the open and closed positions. It should be appreciated that in certain embodiments the valve assembly 10 may be manually operated, for example via a wheel. The illustrated actuator 32 is arranged above a valve bonnet 34, through which the valve stem 20 extends. The bonnet 34 includes a stem opening 36 which is substantially aligned with the stem axis 18. The illustrated bonnet 34 further includes a packing assembly 38, which may be utilized to block ingress of fluids from the flow passage 14 into the actuator 32.

The valve assembly 10 can be, for example, associated with a wellhead assembly that is disposed over a well (e.g., an oil well). The wellhead assembly can include a wellhead housing, a production tree over the housing, and flow lines connected to the tree or wellhead assembly. The flow lines and wellhead assembly can include embodiments of the valve assembly 10 described herein. The valve assembly 10 can be used for controlling fluids that are designed for entry into the wellhead assembly or for controlling well and other fluids that are otherwise travelling along a pipeline. The valve assembly 10 may be positioned in an open position or a closed position. For example, in various embodiments the valve assembly 10 may include a gate valve that operates to control flow in a binary manner (e.g., open or closed). In various embodiments, the fluid (e.g., liquids, gases, solids, or combinations thereof) may be transported through the flow passage 14. In certain embodiments the fluid is a liquid with entrained solid particles, which may be abrasive and erode portions of the valve assembly 10, such as the valve sleeves 30 or the valve body 12, during normal operations. When erosion occurs the valve may no longer function properly, in that fluid may flow by the valve member 22 when the valve member 22 is in the closed position or there may be leakage when the valve member 22 is in the open position. The valve sleeves 30 may be particularly susceptible to erosion in embodiments where the valve sleeves 30 are made of materials that are not as hard as the valve body 12 or are not rated for certain types of fluid, such as carbon steels in sour service when other components of the valve assembly 10 are formed of stainless steel. Accordingly, the valve sleeves 30 may fail or show signs of erosion before other portions of the valve assembly 10. As will be described herein, systems and methods of the present disclosure may be utilized to quickly and efficiently replace the valve sleeves 30 to thereby reduce downtime and costs associated with valve replacement and/or maintenance.

Figure 2:
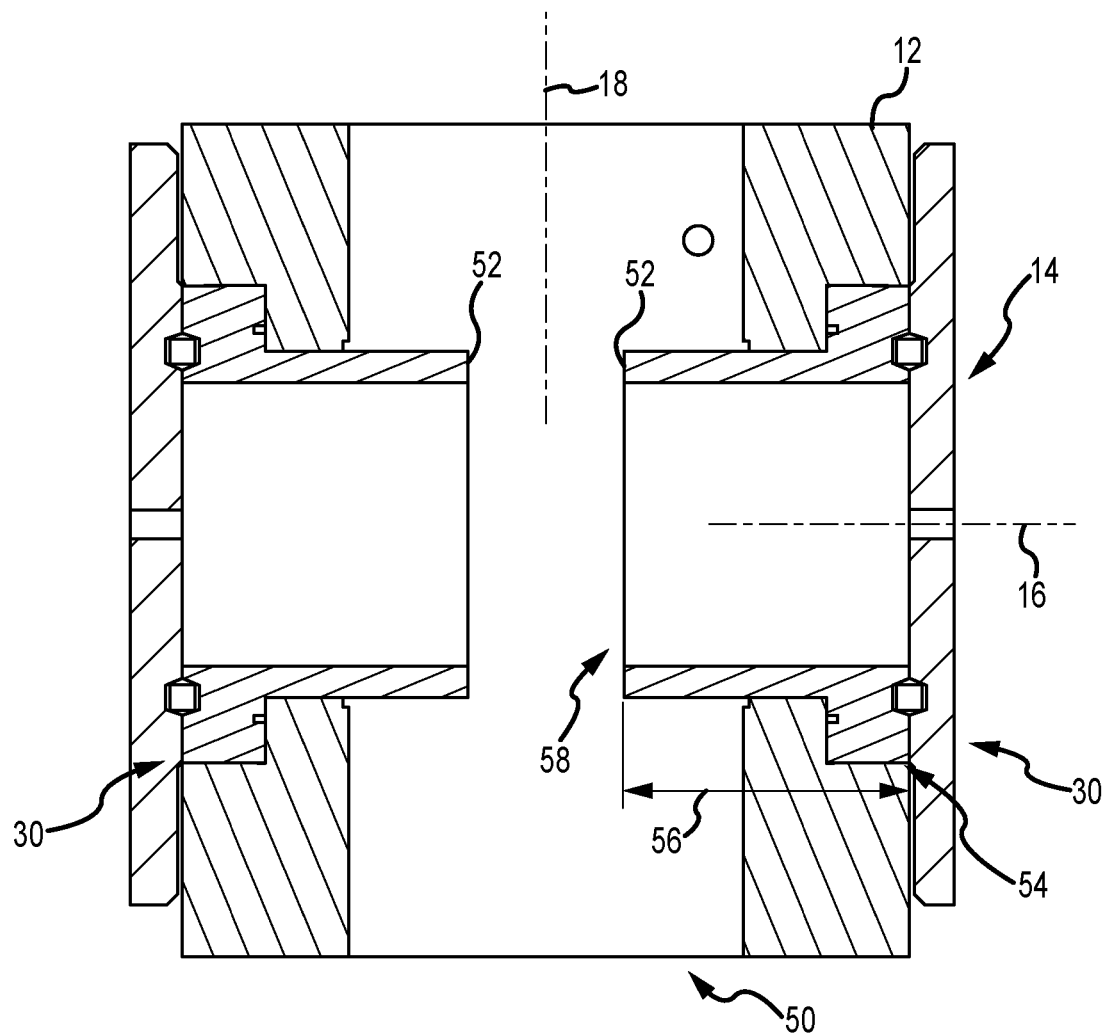
FIG. 2 is a partial cross-sectional side view of an embodiment of valve sleeves, in accordance with embodiments of the present disclosure.

FIG. 2 is a schematic cross-sectional side view of an embodiment of the valve body 12. It should be appreciated that various components have been removed for clarity, such as the valve member 22 and the like. In the illustrated embodiment, a chamber 50 extends along the stem axis 18. As shown in FIG. 1, the chamber 50 enables the valve member 22 to translate between the open and closed positions. The valve sleeves 30 are arranged within the flow passage 14 and extend into the chamber 50. In operator, the valve member 22 will be positioned between the valve sleeves 30 and seal against a respective sleeve face 52 of the valve sleeves 30. This face acts as the valve seat and provides a metal to metal contact and sealing point within the valve assembly 10, in certain embodiments. It should be appreciated that various embodiments may include the valve sleeves 30 and the valve member 22 as metallic components. However, in various embodiments, at least a portion of the valve sleeves 30 or the valve member 22 may not be metallic. For example, the seat faces 52 may be formed from a polymer material or have a polymer coating. Moreover, in embodiments, the seat faces 52 may include one or more seals or gaskets, which may not be metallic. Additionally, the valve member 22 may not be metallic. In various embodiments, the components of the valve assembly 10 may be formed from a number of different materials, such as metals, plastics, and/or composite materials based on different applications. Furthermore, components may include coatings or the like such that while a particular component may be formed from one material, a coating of a different type of material, such as a polymer coating on a metallic component, may be utilized. Accordingly, fluid may travel through the flow passage 14.

In the illustrated embodiment, the valve sleeves 30 are inserts positioned within a receptacle 54 formed in the valve body 12. The size of the valve sleeves 30 may be particularly selected to correspond to the receptacle 54. That is, in various embodiments the valve sleeves 30 can be arranged within the receptacle 54 to be substantially fluid tight and also provide a seating surface for the valve member 22 at the seat faces 52. It should be appreciated that a sleeve length 56 may be particularly selected based on various measurements of the valve assembly 10. For example, a wider valve member 22 may lead to using shorter valve sleeves 30. Accordingly, sizing and tolerances that present challenges with traditional methods of replacing valve seats are addressed by using the valve sleeves 30, which may be designed to accommodate a variety of sizes for a range of valves. Furthermore, the valve sleeves 30 may be designed with an opening 58 to enable full port flow through the valve body 12. That is, the cross-sectional flow area of the flow passage 14 may not be impacted by utilizing the valve sleeves 30. However, in various embodiments, the valve sleeves 30 may be designed to have reduced flow areas to thereby enabling changes in the velocity of the fluid traveling through the valve body 12.

Figure 3:
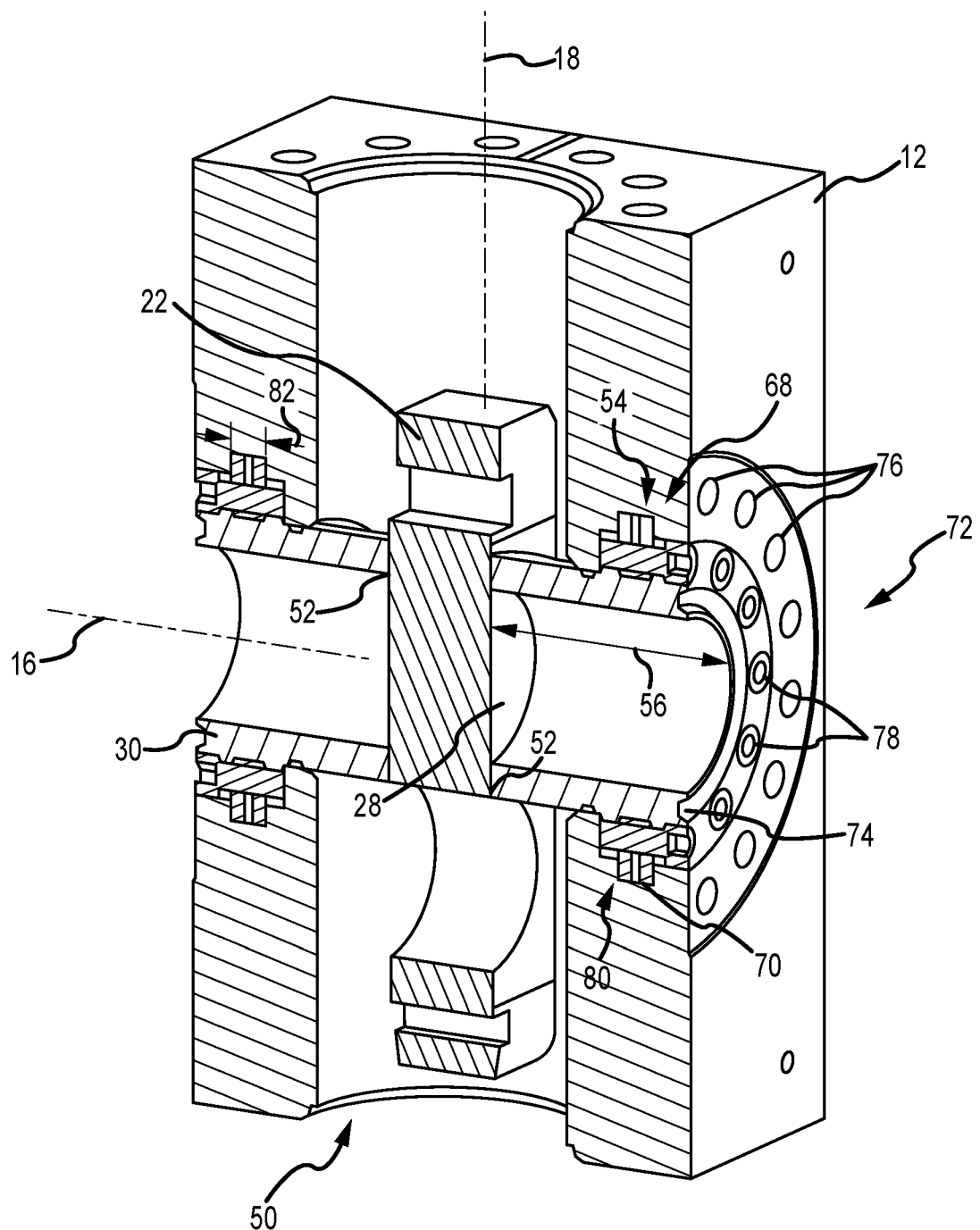
FIG. 3 is a partial front perspective view of an embodiment of a valve assembly having valve sleeves, in accordance with embodiments of the present disclosure.

FIG. 3 is a front perspective view of an embodiment of the valve sleeve 30 having a retaining mechanism 68 including a plurality of retention features 70. As will be described in detail below, the retention features 70 may be utilized to secure the valve sleeve 30 to the valve body 12. The illustrated embodiment includes the valve sleeves 30 arranged within the receptacles 54 and extending into the chamber 50. The valve member 22 is arranged between the valve sleeves 30 within a gap formed between the respective seat faces 52. The illustrated embodiment includes the valve member 22 in the closed position such that the block 28 is arranged within the flow passage 14. As a result, fluid within the flow passage 14 will be prevented from moving past the block 28. Furthermore, as shown in FIG. 3, a metal-to-metal seal is formed between the valve member 22 and the respective seat faces 52, in certain embodiments. However, as described in detail above, in various embodiments one or more components of the valve assembly 10 may not be metallic. For example, the seat faces 52 may be formed from a polymer material, have a polymer coating, or include seals or gaskets. Accordingly, the valve assembly 10 may accommodate high pressure applications with a reduced likelihood of valve leakage.

The valve sleeve 30 of the illustrated embodiment includes a mating face 72 having a groove 74 that may receive a ring joint gasket. The valve body 12 further includes apertures 76 for fasteners, such as bolts, and may be utilized to couple a flanged connected to the valve body 12. The mating face 72 further includes a plurality of actuating recesses 78. In various embodiments, the actuating recesses 78 may be utilized to transition the retention features 70 between engaged and disengaged positions. In the illustrated embodiment, the retention features 70 are in the engaged position, thereby preventing lateral movement of the valve sleeve 30 along the flow axis 16. The illustrated retention features 70 may transition from the disengaged position into the channel 80 illustrated in FIG. 3. The channel 80 may be sized to accommodate the retention features 70 such that moving the retention features 70 into the engaged position may be blocked by the channel 80 if the valve sleeve 30 is not fully inserted into the receptacle 54. In other words, a width 82 of the channel 80 may accommodate the retention features 70 when the aligned with the channel 80. Accordingly, the valve sleeve 30 may be secured to the valve body 12 quickly and efficiently. It should be appreciated that the channel 80 may be formed within the valve body 12 in anticipation of use of the valve sleeves 30. Additionally, in various embodiments, the channel 80 may be machined into the valve body 12 during maintenance operations. That is, the valve body 12 may be designed to operate with the valve sleeves 30 or may be modified to utilize the valves sleeves 30. Accordingly, the valve sleeves may be utilized to retrofit or modify existing valves, thereby reducing costs for operators. In various embodiments, one or more seals, may be arranged about the valve sleeve 30 to block fluid ingress toward the retention features 70. The one or more seals may be arranged about the mating face 72, along the length 56, or any other reasonable location.

Figure 4:
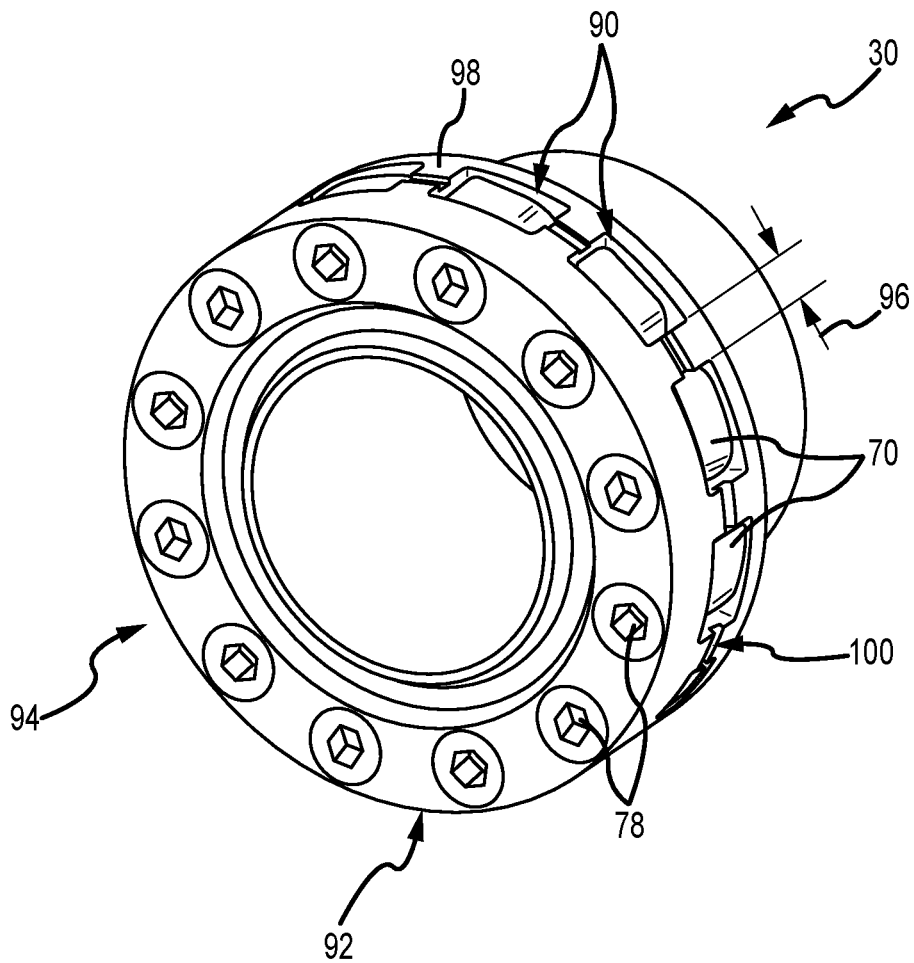
FIG. 4 is a front perspective view of an embodiment of a valve sleeve, in accordance with embodiments of the present disclosure.

FIG. 4 is a front perspective view of the valve sleeve 30 having the retention features 70 in the disengaged position. As illustrated, the retention features 70 are retracted within slots 90 arranged about a circumference 92 of a coupling end 94 of the valve sleeve 30. In the illustrated embodiment, the slots 90 are in a spaced relationship with one another such that the slots 90 are not connected to one other. That is, the slots 90 are arranged a slot distance 96 from one another about the circumference with barriers 98 between the slots 90. In various embodiments, the slots 90 may be arranged at equal slot distances 96 about the circumference 92 of the coupling end 94. However, in other embodiments the slots 90 may be positioned at particular locations where higher stresses or forces are anticipated. It should be appreciated that in various embodiments the slots 90 may connected such that the slot distance 96 and/or the barriers 98 are eliminated. Such configuration may reduce the weight and material cost associated with the valve sleeve 30.

The illustrated embodiment further includes a groove 100 extending about the circumference 92. The illustrated groove 100 is substantially centered relative to the slots 90 and cuts into the barriers 98, extending at least the slot distance 96. The groove 100 is not as deep as the slots 90 in the illustrated embodiment. In various embodiments, a seal or ring may be arranged within the groove 100 and extend about the circumference 92 such that the seal or ring extends over the retention features 70 and the slots 90. In various embodiments, the seal or ring may be formed from an elastic or resilient material that may facilitate transition of the retention features 70 from the engaged position back to the disengaged position. That is, the seal or ring may bias the retention features 70 toward the disengaged position. Furthermore, the seal or ring may provide a fluid tight barrier to block fluid ingress toward the coupling end.

As described above, the actuating recesses 78 may be utilized to move the retention features 70 between the engaged position and the disengaged position. For example, an operator may insert a tool, such as a hex head driver, into the illustrated actuating recesses 78 and provide a rotational force to move the retention features 70 to the engaged position, as will be described in detail below. In various embodiments, the retention features 70 are individually actuatable. In other embodiments, actuation of one of the retention features 70 may drive actuation of the other retention features 70 toward the engaged position.

Figure 5:
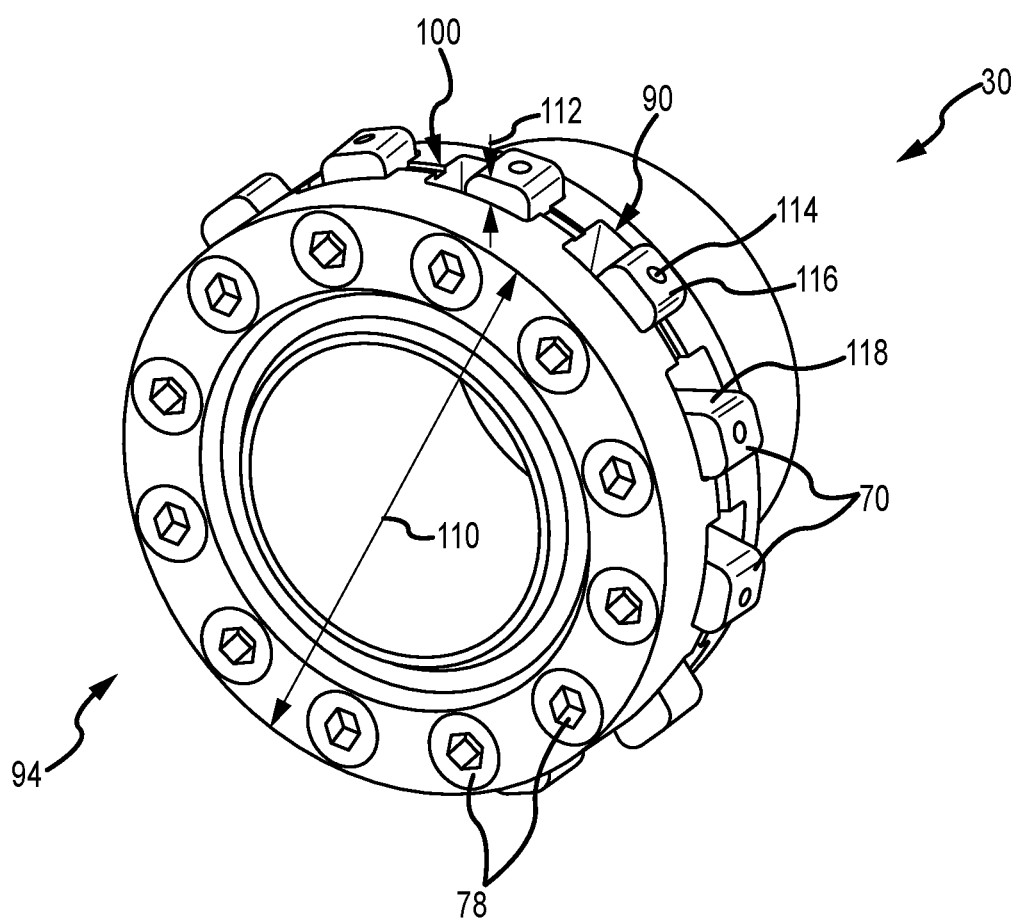
FIG. 5 is a front perspective view of an embodiment of a valve sleeve, in accordance with embodiments of the present disclosure.

FIG. 5 is a front perspective view of an embodiment of the valve sleeve 30 where the retention features 70 are in the engaged position. As illustrated, the retention features 70 extend outwardly past an outer diameter 110 of the coupling end 94. In various embodiments, an operator may utilize the actuating recesses 78 to drive the retention features 70 out of the slots 90 to thereby extend past the outer diameter 110. The retention features 70 extend a retention distance 112 past the outer diameter 110. In various embodiments, the channel 80 formed in the valve body 12 may have a depth substantially equal to the retention distance 112, thereby providing a tight fit for the valve sleeve 30 and limiting or prevent movement of the valve sleeve 30 along the stem axis 18.

The illustrated retention features 70 further include a hole 114 arranged on a surface 116 of the retention features 70. As will be described below, in various embodiments the retention features 70 are moved to the engaged position from the disengaged position via a rotational force applied to the actuating recesses 78. As a result, a retention feature body 118 may rotate about an axis and the surface 116 may rotate from within the slot 90 to the engaged position.

In embodiments including the ring or seal described above, the movement of the retention features 70 from the disengaged position to the engaged position will drive the ring or seal outwardly from the circumference 92. The retention features 70 may be locked or otherwise maintained in the engaged position to block the resilient, biasing force from the seal or ring. Thereafter, as the retention features 70 are returned to the disengaged position, the seal or ring may be arranged within the groove 100.

Figure 6:
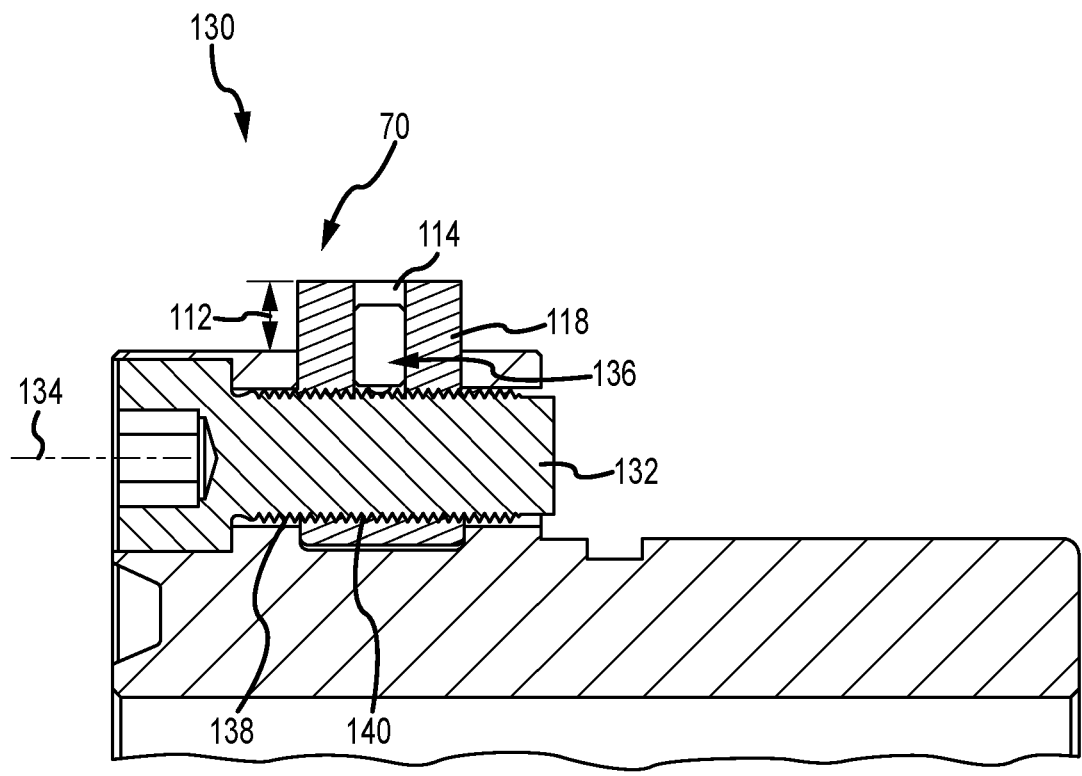
FIG. 6 is a schematic side elevational view of an embodiment of an actuating mechanism, in accordance with embodiments of the present disclosure.

FIG. 6 is a schematic side elevational view of an embodiment of an actuating mechanism 130 that may be utilized to transition the retention features 70 between the engaged and disengaged positions. The embodiment illustrated in FIG. 6 includes the retention feature 70 coupled to a rotating body 132. As the rotating body 132 is rotated about an actuation axis 134, the retention feature body 118 arranged about the rotating body 132 also rotates. For example, the embodiment illustrated in FIG. 6 shows the retention feature 70 in the engaged position. The retention feature 70 extends the retention distance 112. The previously described hole 114 includes a plug 136, which may be utilized to substantially hold or secure the retention feature 70 to the rotating body 132. As a result, rotational forces applied to the rotating body 132 are transmitted to the retention feature 70, thereby enabling movement between the engaged and disengaged positions.

As shown, the rotating body 132 includes threads 138 and the retention feature 70 includes mating threads 140. Accordingly, during assembly, the retention feature 70 may be threaded onto the rotating body 132 and then held in place by the plug 136, which may be a spring plunger with a nylon tip in certain embodiments. The plug 136 bears down against the threads 138 of the rotating body 132, thereby blocking further axial movement of the retention feature 70 relative to the rotating body 132 when rotational forces are applied to the rotating body 132. As a result, when the rotating body 132 is rotated about the actuation axis 134, the retention feature 70 also rotates about the actuation axis 134. In this manner, the retention feature 70 may be transitioned between the engaged and disengaged positions.

Figure 7:
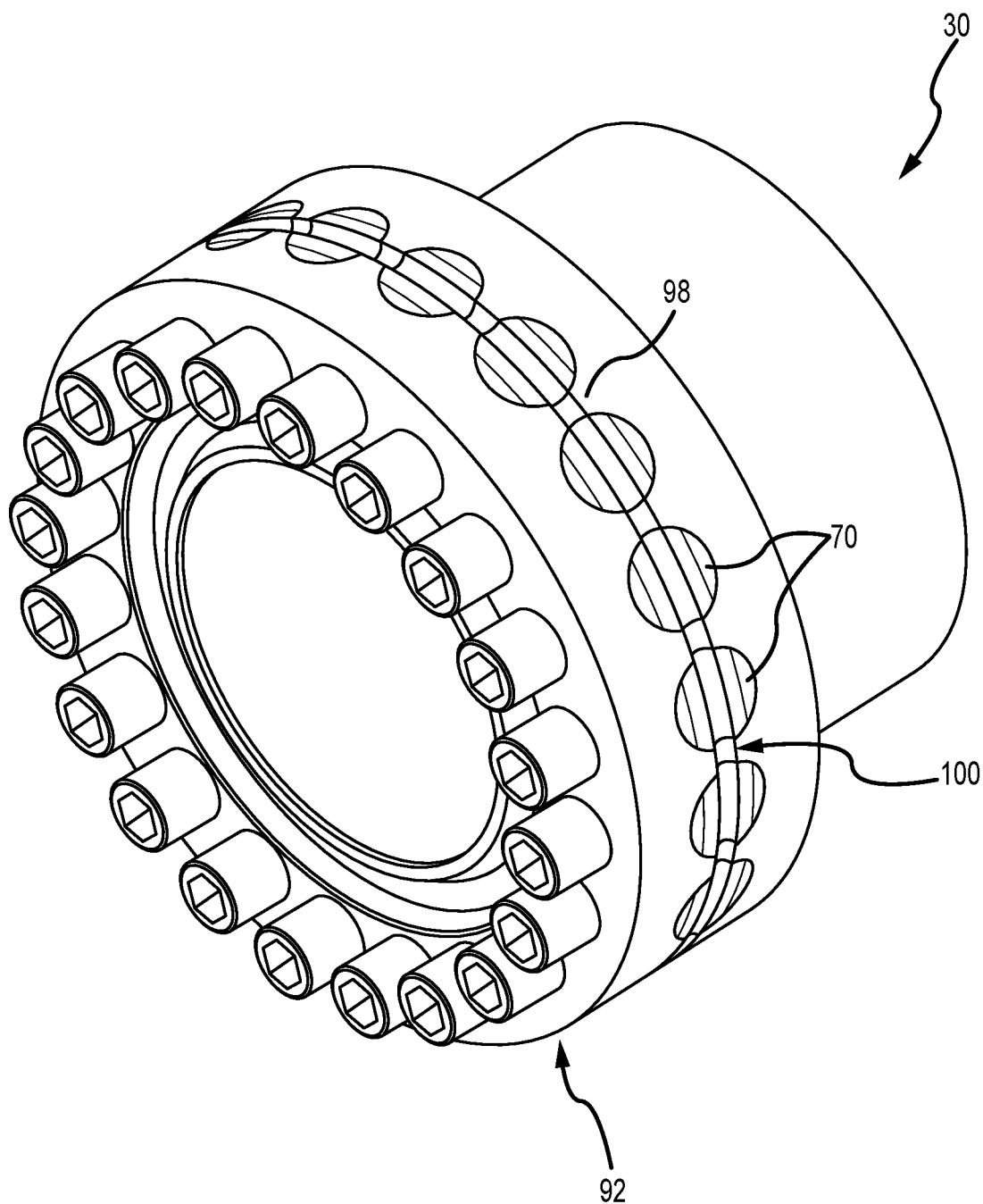
FIG. 7 is a front perspective view of an embodiment of a valve sleeve, in accordance with embodiments of the present disclosure.

FIG. 7 is a front perspective view of an embodiment of the valve sleeve 30 wherein the groove 100 extends continuously and circumferentially about the circumference 92. As shown in the illustrated embodiment, the groove 100 is formed in both the barriers 98 and the retention features 70 when the retention features 70 are in the disengaged position. Accordingly, as described above, the ring or seal may be arranged within the groove 100 to thereby provide a biasing force to drive the retention features 70 back toward the disengaged position and/or provide a seal between the valve sleeve 30 and the valve body 12.

Figure 8:
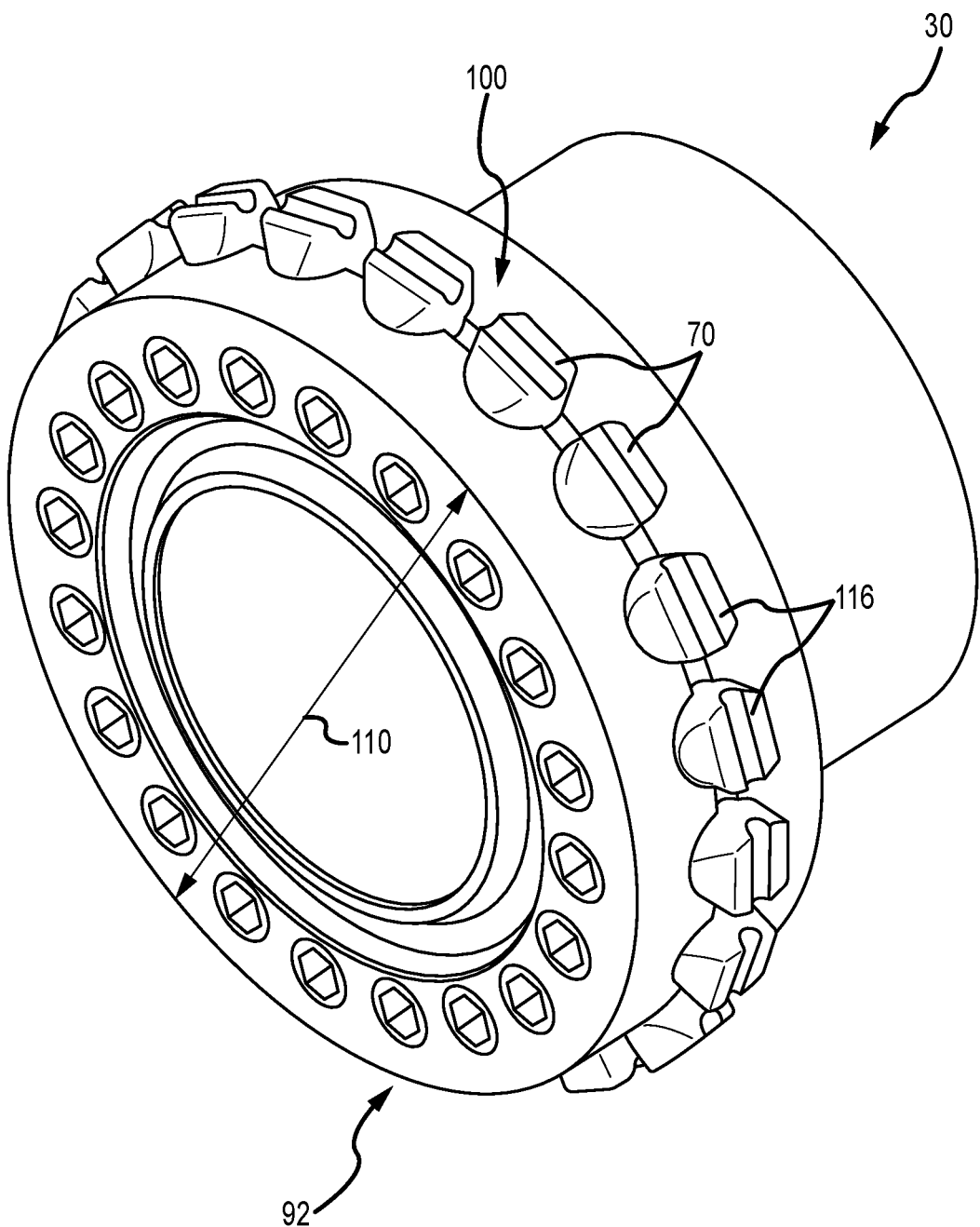
FIG. 8 is a front perspective view of an embodiment of a valve sleeve, in accordance with embodiments of the present disclosure.

FIG. 8 is a front perspective view of an embodiment of the valve sleeve 30 wherein the groove 100 extends continuously and circumferentially about the circumference 92. In the illustrated embodiment, the retention features 70 are in the engaged position such that the respective surfaces 116 of the retention features 70 extend outwardly beyond the outer diameter 110. In the illustrated embodiment, the retention features 70 may not be rotated, as described above, and rather may be driven radially outward via engagement with the actuating recesses 78. Accordingly, the retention features 70 may be utilized to secure the valve sleeve 30 to the valve body 12.

Figure 9:
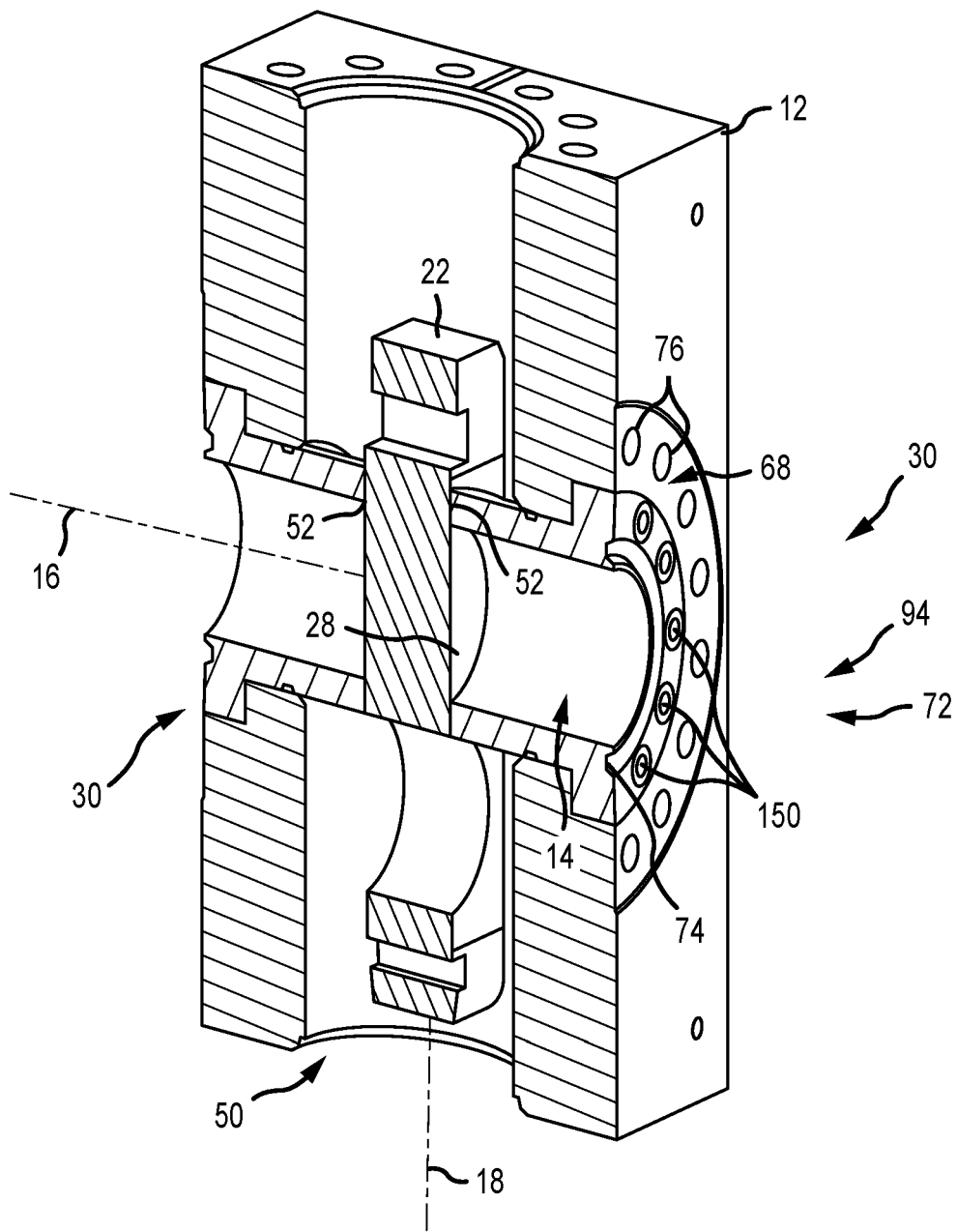
FIG. 9 is a partial front perspective view of an embodiment of a valve assembly having valve sleeves, in accordance with embodiments of the present disclosure.

FIG. 9 is a front perspective cross-sectional view of an embodiment of the valve body 12 including the valve sleeve 30. As described above, the valve body 12 includes the chamber 50, into which the valve sleeves 30 extend. The illustrated embodiment includes the valve member 22 arranged between the valve sleeves 30 such that the valve member 22 contacts the respective seat faces 52. In FIG. 9, the block 28 is positioned within the flow passage 14 to thereby block fluid flow through the valve body.

As described in detail above, the illustrated valve sleeves 30 enable quick and efficient replacement of the seat faces 52, which may be subject to erosion or wear. In the illustrated embodiment, the coupling end 94 of the valve sleeve 30 includes the retaining mechanism 68 including apertures 150 to facilitate coupling of the valve sleeve 30 the valve body 12. For example, the apertures 150 may receive fasteners such as bolts, screw, or the like to connect the valve sleeve 30 the valve body 12, which may further include corresponding holes or apertures to receive the fasteners. In various embodiments, one or more seals may be arranged on a back side of the coupling end 94 to thereby block ingress of fluid toward the coupling end 94. In the illustrated embodiment, the apertures 150 are arranged radially outward from the groove 74 of the mating face 72 and radially inward of the apertures 76 of the valve body 12. As a result, the retaining mechanism 68 does not interfere with normal coupling of components to the valve body 12. In this manner, the valve sleeve 30 may be efficiently and quickly connected to and removed from the valve body 12.

Figure 10:
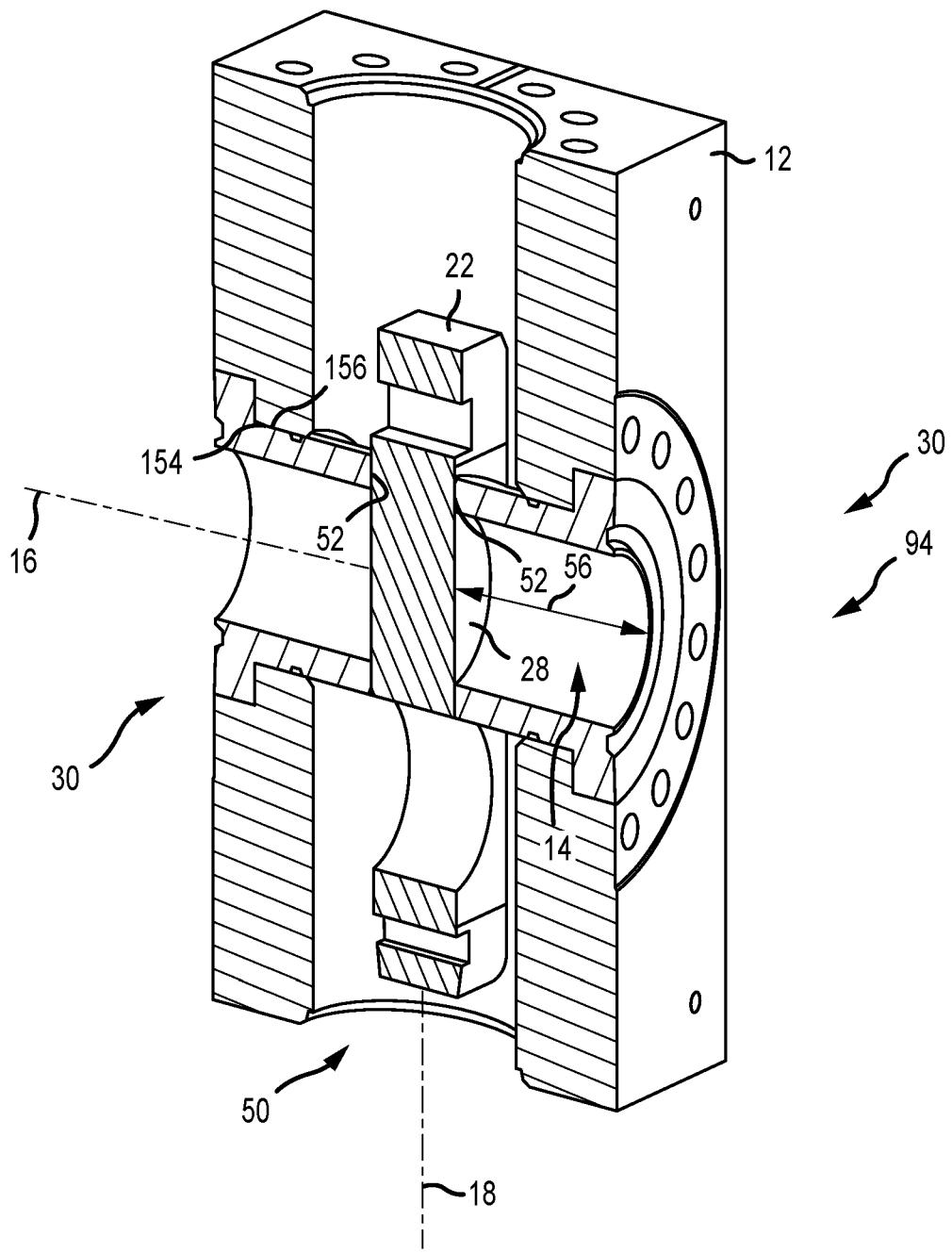
FIG. 10 is a partial front perspective view of an embodiment of a valve assembly having valve sleeves, in accordance with embodiments of the present disclosure.

FIG. 10 is a front perspective cross-sectional view of an embodiment of the valve body 12 including the valve sleeve 30. As described above, the valve body 12 includes the chamber 50, into which the valve sleeves 30 extend. The illustrated embodiment includes the valve member 22 arranged between the valve sleeves 30 such that the valve member 22 contacts the respective seat faces 52. In FIG. 10, the block 28 is positioned within the flow passage 14 to thereby block fluid flow through the valve body.

As described in detail above, the illustrated valve sleeves 30 enable quick and efficient replacement of the seat faces 52, which may be subject to erosion or wear. In the illustrated embodiment, the valve sleeve 30 includes threads 154 that mate with corresponding threads 156 formed within the valve body 12. The threads may be arranged along the length 56, the coupling end 94, or any other reasonable location along the valve sleeve 30. In this manner, the valve sleeve 30 may be efficiently and quickly connected to and removed from the valve body 12.

Figure 11:
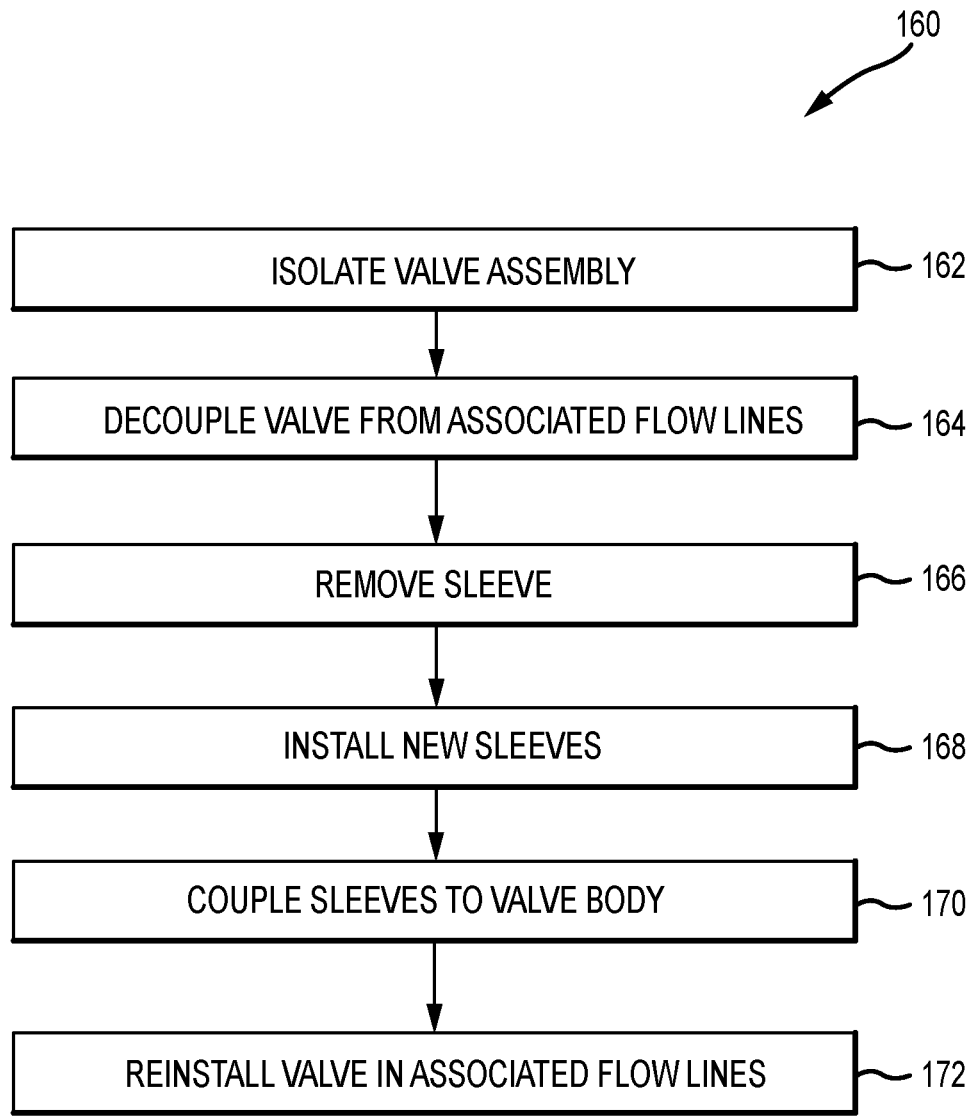
FIG. 11 is a flow chart of an embodiment of a method for installing a valve sleeve, in accordance with embodiments of the present disclosure.

FIG. 11 is a flow chart of a method 160 for replacing valve seats in a valve assembly. It should be appreciated that steps of the method 160 may be performed in any order or in parallel unless explicitly described otherwise. In embodiments, the valve assembly 10 is isolated (block 162). For example, flow through the flow passage 14 may be blocked and the valve assembly 10 may be cleared, for example using a nitrogen purge. The valve assembly 10 is decoupled from associated flow lines (block 164). For example, associated piping components coupled to the valve body 12 via the apertures 76 may be removed to provide access to the interior portions of the valve 12. In various embodiments, the seat faces 52 are prepared for replacement (block 166). In certain embodiments, preparing the seat faces 52 for replacement may include removing previously installed valve sleeves 30. In other embodiments, preparing the seat faces 52 for replacement may include machining or otherwise modifying the valve body 12 for installation of the valve sleeves 30. Next, new valve sleeves 30 may be installed (block 168). For example, the valve sleeves 30 may be aligned with the flow passage 14 and installed within the valve body 12. In various embodiments, the valve sleeves 30 extend into the chamber 50 to provide a seating face for the valve member 22. After the valve sleeves 30 are installed, they may be coupled to the valve body 12 (block 170). The retaining mechanism 68 may be used to couple the valve sleeves 30 to the valve body 12. For example, in embodiments, the retaining mechanism 68 may refer to the retention features 70 that are rotated or otherwise positioned within with channel 80 in the valve body 12. In other embodiments, the retaining mechanism 68 may refer to the apertures 150 for receiving fasteners to couple the valve sleeves 30 to the valve body 12. Furthermore, in various embodiments, the retaining mechanism 68 may refer to the threads 154, 156 for coupling the valve sleeves 30 to the valve body. Thereafter, the valve assembly 10 may be reinstalled (block 172). Accordingly, the valve assembly 10 may be quickly and efficiently removed and repaired. In various embodiments, the bonnet 34 will not be removed during installation of the valve sleeves 30, thereby further saving time and sources for the replacement. Accordingly, embodiments the present disclosure describe systems and methods for improved maintenance and repair for valve components.

Figure 12:
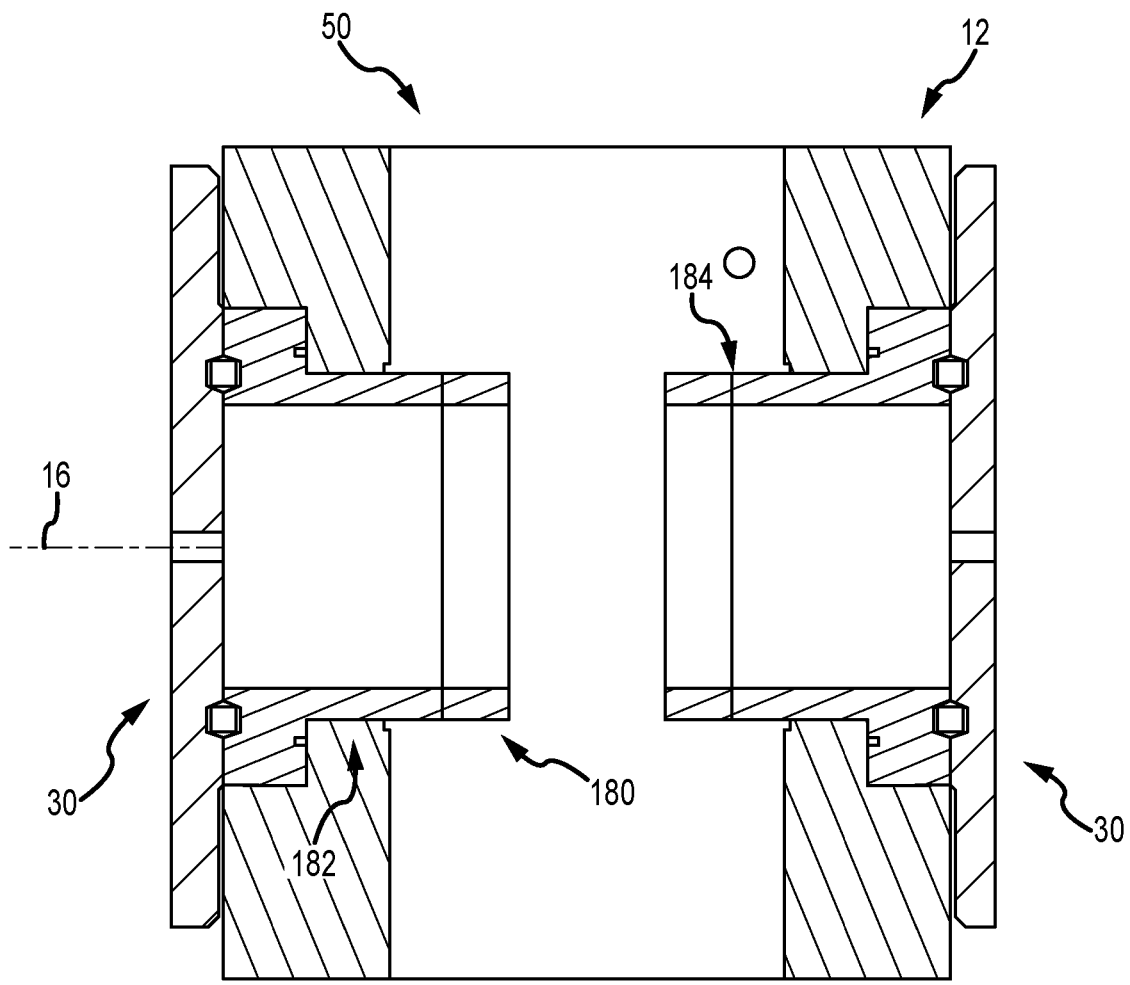
FIG. 12 is a partial cross-sectional side view of an embodiment of valve sleeves, in accordance with embodiments of the present disclosure.

FIG. 12 is a cross-sectional side view of an embodiment of the valve sleeves 30 extending into the chamber 50 of the valve body 12. In the illustrated embodiment, the valve sleeves 30 include the seat faces 52 as a removable and replaceable component of the valve sleeves 30. As shown in FIG. 12, the seat faces 52 are arranged on a seat end 180 coupled to a sleeve portion 182. Accordingly, the seat faces 52 may be removed and replaced without replacing different portions of the valve sleeve 30, such as the sleeve portion 182. In various embodiments, the seat faces 52 may be sacrificial components particularly selected to wear or erode before other components of the valve assembly 10, such as the valve body 12. As described above, the valve body 12 may be more expensive and/or more difficult to repair. By selecting the material of the seat faces 52 to preferentially wear out in favor of the valve body 12, the cost or difficulty associated with repairing the valve body 12 may be substantially reduced or eliminated. In the illustrated embodiment, the seat faces 52 on the sleeve portion 182 are coupled to the sleeve portion 182 via a connection mechanism 184, which may be fasteners, threads, clamps, or the like. For instance, the sleeve portion 182 and seat end 180 may include apertures that align to enable coupling via fasteners such as bolts. In various embodiments, the seat end 180 and the sleeve portion 182 include mating threads to facilitate connection between the components. Further, in various embodiments, the sleeve portion 182 and the seat end 180 may be clamped together. Additionally, in embodiments, the seat end 180 may be press fit or otherwise mechanically coupled to the sleeve portion 182. In this manner, the sleeve portion 182 may be removed from the valve body 12 and the seat end 180 may be replaced without replacing the sleeve portion 182. As a result, costs associated with replacing the seat faces 52 may be reduced. Furthermore, portions of the valve sleeve 30, such as the sleeve portion 182, which are not damaged or otherwise degraded due to operating conditions, may be reused.

As described in detail above, embodiments of the present disclosure describe systems and methods for using and installing the valve sleeves 30 within the valve body 12 of the valve assembly 10. In various embodiments, the valve sleeve 30 may extend the sleeve length 56 into the chamber 50 formed within the valve body 12. The valve sleeve 30 may include the seat face 52 which may serve as a seating face for the valve member 22 within the valve body 12. As the valve member 22 is transitioned between open and closed positions, the valve member 22 may come in contact with the seat face 52 to form a seal, which may be metal-to-metal, to facilitate transportation of fluids through the flow passage 14 of the valve body 12, or to block transportation of fluids. In various embodiments the valve sleeve 30 includes retaining mechanisms 68, such as the retention features 70, threads 154, 156, apertures 150 for fasteners, or the like to couple the valve sleeve 30 to the valve body 12. It should be appreciated that embodiments of the present disclosure facilitate efficient replacement and/or repair of valve assembly components. For example, the valve sleeve 30 may be quickly replaced and may be particularly selected to accommodate various tolerances or clearances within the valve. Moreover, the material of the valve sleeve 30 may be particularly selected to act as a sacrificial component to protect different components, such as the valve body 12. Further, in embodiments, the valve sleeve 30 may be retrofit for use in existing valves via one or more machining or working processes to facilitate coupling of the valve sleeve 30 the valve body 12. In this manner, costs and difficulties associated with valve maintenance and repair may be reduced.

In various embodiments, the above disclosed valve sleeves 30 may be used in any application that involves controlling or otherwise regulating a flow of a fluid (e.g., a gas, a liquid, a solid, or a combination thereof). For example, in various embodiments the valve sleeves 30 may utilized for hydraulic fracturing operations, which may include fracturing fluids formed from a slurry having abrasive particles, such as proppant. Furthermore, in embodiments, the valve sleeves 30 may be utilized for valves in other oil field applications, such as drilling mud lines, recovery tubing, wellhead assemblies, and the like. Additionally, downstream refining or chemical production operations may utilize embodiments of the present disclosure. By way of example, petrochemical refining and/or specialty chemical refining may use abrasive and/or corrosive fluids for a variety of applications. Utilizing of the systems and methods described herein may facilitate reduced costs for replacing sections of valves, rather than wholly replacing valves. Additionally, concerns with downtime and leakages are as prevalent in downstream operations as in oil recovery. Furthermore, embodiments of the present disclosure may be utilized in water treatment or power generation operations, where fluids may include abrasive and/or corrosive materials. Accordingly, embodiments of the present disclosure may be utilized in a variety of operations that include valves for regulating a fluid flow. Furthermore, while embodiments described herein may reference gate valves, it should be appreciated that the valve sleeves 30 may be utilized with different types of valves, such as globe valves, ball valves, butterfly valves, needle valves, and the like.

The foregoing disclosure and description of the disclosed embodiments is illustrative and explanatory of the embodiments of the invention. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A valve for controlling a fluid flow, the valve comprising:
 a valve body having an inlet at a first end, an outlet at a second end, and a chamber positioned between the inlet and outlet;
 a valve member moveable between an open position and a closed position, the valve member positioned within the chamber and blocking flow through the valve body when in the closed position and enabling flow through the valve body when in the open position;
 a valve sleeve extending from at least one of the inlet or outlet into the chamber, the valve sleeve comprising a seat face at a seat end proximate the valve member, the valve sleeve abutting a shoulder formed along a flow path through the chamber, the shoulder facing a direction opposite the seat end, wherein the valve member contacts the seat face when in the open position and the closed position; and
 a retaining mechanism coupling the valve sleeve to the valve body, the retaining mechanism mounted on at least one of the valve sleeve or the valve body and configured to transition the valve sleeve between an engaged position where the valve sleeve is coupled to the valve body and a disengaged position where the valve sleeve is not coupled to the valve body, the retaining mechanism comprising:
  a retention feature moveable between the engaged position and the disengaged position, the retention feature being stored within an outer diameter of the valve sleeve when in the disengaged position and extending radially outward from the outer diameter when in the engaged position; and
  an actuating mechanism, the actuating mechanism driving movement of the retention feature between the engaged position and the disengaged position, the actuating mechanism comprising:
   a rotating body coupled to the retention feature, the rotating body rotating about an actuation axis to transition the retention feature between the engaged and disengaged positions; and
   a plug coupling the retention feature to the rotating body, the plug blocking independent rotation of the retention feature about the actuation axis to thereby transmit rotation of the rotating body to the retention feature.

2. The valve of claim 1, wherein the retention mechanism comprises:
 a plurality of apertures arranged circumferentially about a coupling end of the valve sleeve, the apertures aligning with corresponding apertures formed in the valve body; and
 fasteners extending through the apertures to couple the valve sleeve to the valve body.

3. The valve of claim 1, wherein the retention mechanism comprises:
 threads arranged along at least a portion of a length of the valve sleeve; and
 mating threads arranged within a receptacle formed in the valve body.

4. The valve of claim 1, wherein the valve sleeve comprises:
 the seat end including the seat face; and
 a sleeve portion including a coupling end, wherein the seat end is removably coupled to the sleeve portion.

5. The valve of claim 4, wherein the seat end and the sleeve portion are made of different materials.

6. A valve sleeve for forming at least a portion of a valve flow passage, the valve sleeve comprising:
 a seat end having a seat face, the seat end extending at least partially into a chamber of a valve body;
 a sleeve portion coupled to the seat end and having a coupling end opposite the seat face, the coupling end comprising a retaining mechanism for removably coupling the valve sleeve to the valve body, the sleeve portion being positioned to contact an outward facing shoulder of the valve body at an outer diameter greater than an inner diameter of the seat face, the retaining mechanism comprising:
  a retention feature for securing the valve sleeve to the valve body, the retention feature extending radially outward from the coupling end and into a channel formed in the valve body;
  an actuating mechanism for moving the retention feature between an engaged position where the retention feature extends radially outward from the coupling end and a disengaged position where the retention feature is within a slot formed in the coupling end; and
  actuating recesses formed in the coupling end, the actuating recesses being used to drive movement of the actuating mechanism; and
 an opening extending along a length of the valve sleeve, the opening forming at least a portion of the valve flow passage and having a generally circular cross section.

7. The valve sleeve of claim 6, further comprising a mating face at the coupling end, the mating face including a groove for receiving a ring joint gasket, the groove being arranged radially outward from the opening and radially inward from the retaining mechanism.

8. The valve sleeve of claim 6, wherein the coupling end comprises:
- a plurality of slots extending radially inward from an outer diameter of the coupling end;
- a barrier arranged between each slot of the plurality of slots, the respective barriers separating the slots from adjacent slots; and
- a groove extending circumferentially about an outer diameter of the coupling end, the groove extending radially inward into each barrier.

9. The valve sleeve of claim 8, further comprising a resilient member arranged within the groove.

10. The valve sleeve of claim 6, wherein the retaining mechanism comprises:
- a plurality of apertures arranged circumferentially about a mating face of the coupling end, the apertures positioned radially outward from the opening;
- a plurality of mating apertures extending into the valve body; and
- a plurality of fasteners extending through the apertures and the mating apertures, the fasteners coupling the valve sleeve to the valve body.

11. The valve sleeve of claim 6, wherein the seat end is removably coupled to the sleeve portion and the seat end is comprised of a different material than the sleeve portion.

12. The valve sleeve of claim 6, wherein at least a portion of the valve sleeve is comprised of a material having different properties than a material of the valve body.

* * * * *